D. H. BELLAMORE.
DISK WHEEL.
APPLICATION FILED NOV. 10, 1921.
1,410,986.
Patented Mar. 28, 1922.
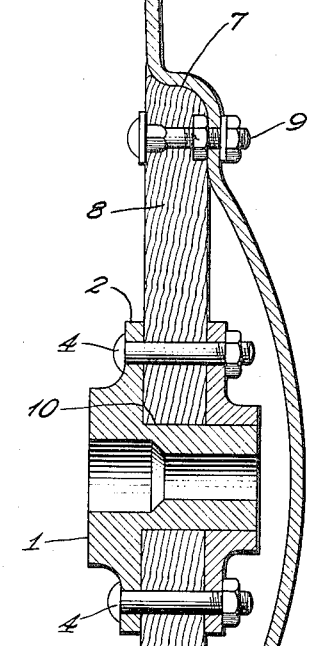
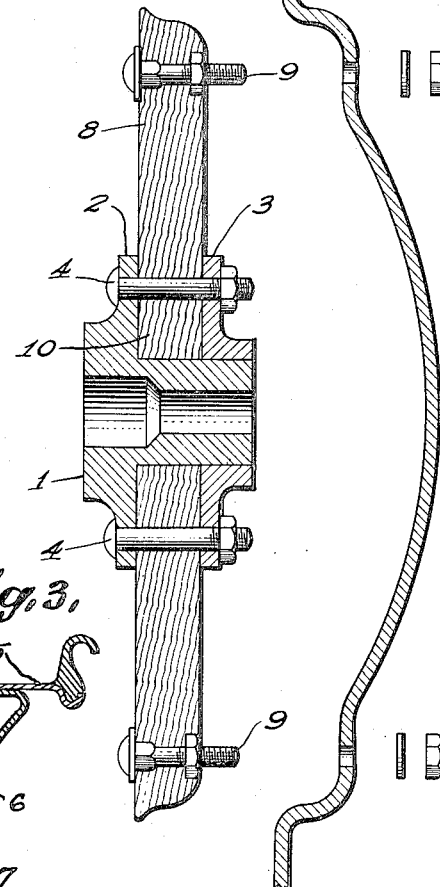
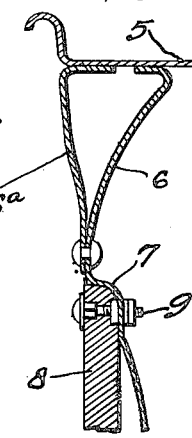
INVENTOR.
David H. Bellamore
BY Jas. H. Griffin
ATTORNEYS.

UNITED STATES PATENT OFFICE.

DAVID H. BELLAMORE, OF NEW YORK, N. Y.

DISK WHEEL.

1,410,986. Specification of Letters Patent. Patented Mar. 28, 1922.

Application filed November 10, 1921. Serial No. 514,140.

*To all whom it may concern:*

Be it known that I, DAVID H. BELLAMORE, a citizen of the United States, residing at New York city, borough of Manhattan, in the county and State of New York, have invented a certain new and useful Disk Wheel, of which the following is a specification.

This invention is a disk wheel and the object of the invention is to provide a wheel of extremely simple construction and one wherein the hub of the wheel is enclosed by the disk, so as to be in concealed position, and to construct such a wheel in a manner to permit of its removal from the hub in an easy and expeditious manner without requiring the loosening of the hub bolts.

A further object of the invention is to provide a wheel of relatively great strength, even though relatively thin material is employed in the making of the disk, and to produce a wheel which will be unusually attractive in appearance.

Another object of the invention is to so construct the wheel that it may be readily cleaned by virtue of the fact that there are no sharp angles into which dirt, grease or mud can accumulate.

Features of the invention, other than those specified, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 1 is a central section through a wheel embodying the present invention, showing the parts in assembled relation;

Figure 2 is a like section showing the disk portion of the wheel demounted; and

Figure 3 shows a slightly modified form of construction on a reduced scale and in section.

Referring to the drawing, 1 designates a hub of any conventional form, practically all of which hubs are provided with a fixed flange 2 and a relatively movable flange 3 and hub bolts 4 adapted to be passed through the fixed and movable flanges for mounting a conventional wooden wheel on the hub. The hub of the wheel of the present invention may differ from the form shown, and, in fact, may partake of any suitable form, but that illustrated is of a conventional wooden wheel and is shown in order that it may be clearly apparent that the wheel of this invention may be readily applied to the conventional wooden wheel hub by merely removing the wooden spokes and felly from the hub portion of the wheel.

In carrying out the present invention, I mount a fixed rim portion 5 of any conventional form on the outer circumference of a disk 6. The disk 6 may be riveted, welded or otherwise associated with the rim, so as to be permanently attached thereto and is preferably stamped up so as to partake of the general shape illustrated in the drawings with the central portion of the disk solid and not punched out to receive the hub as is usual in disk wheel construction.

The disk 6 is thus continuous across its entire section, but is preferably offset from its inner face to provide a recess or depression 7 adapted to receive a spacing and supporting member 8 to which the disk is bolted at suitable intervals by means of bolts 9.

The spacing and supporting member 8 may be constructed of any material and may be made solid as shown, and it may be built up structurally or may be formed by bending up sheet metal. The function of this spacing and supporting member is to support the disk from the hub and to this end, it is made of sufficient thickness adjacent its central hub opening 10 to be received between the fixed and movable flanges 2 and 3 and be perforated, so that the hub bolts 4 may be passed through the flanges 2 and 3 and through the perforations of the spacing and supporting member 8, and screwed up tightly to firmly clamp said member on the hub. The bolts 9 are carried by the member 8 adjacent its outer periphery and project in an outward direction, so that when the disk is slipped thereover and the nuts of said bolts tightened, the disk will be firmly secured to the spacing and supporting member. The parts are preferably so constructed that the shoulder 7 will engage with the outer circumference of the member 8, so that when weight is imposed upon the wheel, a bearing will be formed between the shoulder 7 and said member which bearing will carry the load so that the bolts 9 will not be subjected to shearing strains.

For ordinary light cars, the single disk 6 is all that is required, but if it is desired to strengthen the construction, an annular disk 6ª may be incorporated as shown in Figure 3. The outer margin of the disk 6ª is adapted to be secured to the fixed rim 5 in any suitable manner and said disk is preferably riveted, welded or otherwise permanently secured adjacent its inner margin of the disk 6. The inner margin of the disk 6ª may, however, be extended to the shoulder 7 and turned in under the shoulder, so as to bear against the outer circumference of the member 8. This will give a stronger construction since the weight imposed on the disk 6ª will be borne directly by the outer circumference of the member 8.

In associating the wheel of the present invention with a conventional wooden wheel hub, the wooden spokes are removed and the spacing and supporting member 8 bolted between the flanges 2 and 3. Thereafter the disk portion of the wheel is brought into position with the bolts 9 passing through perforations in the disk 6 and the nuts of said bolts are tightened up to complete the assembly of the parts. If it is desired at any time to remove the disk portion of the wheel, as in the event of puncture or blow-out of the tire carried thereby, it is only necessary to remove the nuts of the bolts 9, whereupon the disk portion of the wheel with the tire thereon may be bodily removed from the spacing and supporting member 8 and a new wheel disk with a properly inflated tire positioned thereon.

It will thus be apparent that the wheel of the present invention provides a construction which may be readily and expeditiously demounted on the road without necessitating any manipulation of the hub bolts. Moreover, the wheel is æsthetic and pleasing in appearance and as the disk entirely covers the face of the hub, the hub parts are concealed and dirt, grease or mud cannot lodge thereabout.

A further feature of advantage is that the outer circumference of the spacing and supporting member carries the weight imposed on the wheel, and the bolts 9 merely serve to hold the parts in assembled relation. It will be understood that when the wheel of this invention is used as a rear wheel, the brake drum may be secured in position by the bolts 9.

I am aware that modifications and details of construction may be made without departing from the spirit of this invention, which is to be understood as broadly novel as is commensurate with the appended claims.

Having thus fully described the invention, what I claim as new and desire to secure by Letters Patent is:

1. A disk wheel embodying a hub, a spacing and supporting member secured to the hub and extending radially therefrom, in combination with a disk detachably secured to the spacing and supporting member and provided with a solid center adapted to cover and conceal the hub, and a rim associated with the outer periphery of the disk.

2. A disk wheel embodying a hub, a spacing and supporting member secured to the hub and extending radially therefrom, a disk provided with a shoulder adapted to seat upon the outer periphery of the spacing and supporting member, means for securing the disk in seated position, and a rim associated with the outer periphery of the disk, the central portion of the disk being imperforate, whereby it is adapted to cover and conceal the hub.

3. A disk wheel embodying a hub provided with fixed and adjustable flanges, hub bolts associated with said flanges, a spacing and supporting member associated with the hub, clamped between the flanges by the hub bolts and extending in a radial direction beyond the flanges, a disk provided with an imperforate center and carrying a rim at its outer periphery, and means independent of the hub bolts for securing the disk to the spacing and supporting member.

4. A disk wheel embodying a hub provided with fixed and movable flanges and hub bolts associated with the flanges, in combination with a disk, formed to cover and conceal the hub and provided at its outer periphery with a rim, and means secured to the disk and clamped to the hub by the hub bolts, for mounting the disk on the hub.

5. A disk wheel embodying a hub provided with fixed and movable flanges and hub bolts associated with the flanges, in combination with a disk formed to cover and conceal the hub and provided at its outer periphery with a rim, means detachably secured to the disk at a distance from the hub and also secured to the hub by the hub bolts for mounting the disk on the hub.

6. A disk wheel embodying a hub, a rim, a disk positioned within the rim and secured thereto and having a central solid integral portion adapted to cover and conceal the hub, and means for mounting the disk on the hub.

7. A disk wheel embodying a hub, a rim, a disk positioned within the rim and secured thereto and having a central solid integral portion adapted to cover and conceal the hub, and means for mounting the disk on the hub and simultaneously spacing the disk from the hub.

8. A disk wheel embodying a hub, a spacing and supporting member associated with the hub and extending radially therefrom, a disk provided at its inner face with a recess adapted to receive the spacing and supporting member and formed at its center to enclose and conceal the hub, means for detachably securing the spacing and supporting member in the recess of the disk, and a rim associated with the outer periphery of the disk.

In testimony whereof I have signed the foregoing specification.

DAVID H. BELLAMORE.